United Sta

Appeldorn et al.

[11] 3,972,593

[45] Aug. 3, 1976

[54] LOUVERED ECHELON LENS

[75] Inventors: Roger H. Appeldorn, Grant Township, Washington County; Raymond H. Anderson, St. Mary's Point, both of Minn.

[73] Assignee: Minnesota Mining and Manufacturing Company, St. Paul, Minn.

[22] Filed: July 1, 1974

[21] Appl. No.: 484,619

[52] U.S. Cl. .............................. 350/211; 350/276 R
[51] Int. Cl.² ............................................. G02B 3/08
[58] Field of Search ...................... 161/1, 3, 3.5, 6; 350/211, 276 R; 353/38

[56] References Cited
UNITED STATES PATENTS

| 3,134,021 | 5/1964 | Ploke | 350/211 X |
| 3,511,563 | 5/1970 | Erwin | 350/211 X |
| 3,661,385 | 5/1972 | Schneider | 350/211 X |
| 3,712,707 | 1/1973 | Henkes, Jr. | 350/211 X |
| R27,617 | 4/1973 | Olsen | 161/6 |

*Primary Examiner*—John K. Corbin
*Assistant Examiner*—Conrad Clark
*Attorney, Agent, or Firm*—Alexander, Sell, Steldt & Delahunt

[57] ABSTRACT

Louvered echelon lenses are provided that comprise an optically clear layer having at least one of its large-area surfaces configured as a set of echelon lens elements, and physically attached in optical connection with said layer, an internally louvered layer that comprises an optically clear polymeric matrix and a set of thin optically limiting louvers supported within the matrix in a spaced side-by-side relation.

19 Claims, 12 Drawing Figures

LOUVERED ECHELON LENS

INTRODUCTION

Echelon lenses comprising polymeric sheets having at least one of their large-area surfaces configured as a set of echelon lens elements are useful to enhance a variety of diplays of graphic information. For example, such echelon lenses may be placed over a matrix of light-emitting diodes to enlarge the symbols that are displayed on the matrix. Similarly, the lenses may be used to enlarge a display of information on a nematic liquid crystal device, to enlarge images on a cathode ray tube, or to enlarge an image projected from the rear onto a panel or screen.

While the use of an echelon lens in the described manner offers significant advantages in itself, it has now been found that a unique echelon lens construction provides even better results. This unique construction overcomes a problem inherent in an echelon lens, namely a lack of contrast between an image focused by the lens and the lens itself. This lack of contrast arises because a portion of the light rays passing through the lens are reflected within the lens by the facets of the linear lens elements, with the result that light rays emanate from the whole surface of the lens. These internally reflected light rays provide a background for the focused image, which is accordingly less distinct than it would be if there were no internal reflections.

The present invention improves the contrast of an echelon lens by use of an internally louvered layer superposed over the echelon lens elements. It has been found that by superposing the louvered layer — which comprises a set of optically limiting louvers supported in spaced side-by-side relation in an optically clear polymeric matrix — in close proximity to an optically clear layer configured as the echelon lens elements, the louvers reduce the internal reflections of the lens elements and increase contrast.

Further, the invention achieves this improvement in contrast without introducing undesired moiré patterns that normally occur upon superpositioning of two grids or networks of closely spaced lines. Such moiré patterns are very noticeable when a typical fresnel lens, such as the condensing lens used in an ovehead projector having a large-diameter set of concentric annular echelon lens elements, is superposed in close proximity over an internally louvered layer. At worst, such moire patterns would seriously interfere with a message being presented by a graphic display, and at best they would be distracting, often to the point of commercial unacceptability.

By using echelon lens elements superposed in proper alignment over layers containing linear louvers, preferred lenses of the invention reduce moiré patterns to such a fine grain that they are not detected by human vision. For example, by arranging the linear louvers at right angles to linear echelon elements, there is only point-type overlap of the louvers and echelon lens elements, with the result that no moiré patterns are seen by a viewer. Further, by using two superposed linear echelon lenses, with the linear echelon lens elements at right angles to one another, and with an internally louvered layer between the two lenses aligned so that the louvers are at 45° to the linear echelon lens elements of both lenses, a louvered echelon lens is obtained that is capable of two-axis or point focusing but does not exhibit detectable moire patterns. The resulting lens effectively focuses like a fresnel lens having concentric annular lens elements, and it can be made in large diameter sizes without causing the distracting moire patterns that occur upon use of an internally louvered layer and a typical large-diameter fresnel lens.

SUMMARY OF THE INVENTION

Briefly, a lens of the invention, which for purposes herein will be described as a louvered echelon lens, comprises, 1. an optically clear layer having at least one of its large-area surfaces configured as a plurality of echelon lens elements that direct light rays transmitted through the layer in a predetermined manner, and
2. physically united in optical connection with said layer, an internally louvered sheet comprising an optically clear polymeric matrix and a set of thin optically limiting linear louvers supported within the matrix in spaced side-by-side relation, with each louver being set at an angle to the faces of the sheet.

(By the term "echelon lens" it is meant a structure that includes a plurality of echelon lens elements. These echelon lens elements may cooperate to direct light rays toward one or more focuses, or they may direct light rays in other ways, as when all the echelon lens elements have the same configuration and refract incident light rays to the same degree. A lens of the invention may also comprise an array of individual lenses. For example, a lens of the invention may include several groups of annular echelon lens elements; each group is usually concentric about a different axis, but may be concentric about the same axis, as when each different group cooperates to direct light rays to a different focus. The term array is also applied to a lens that comprises linear echelon lens elements that cooperate to direct light rays to a single linear focus, since different sections or portions along the length of the lens may be used to direct light rays from different light sources, as from different portions of a matrix of light-emitting diodes; in such situations each section may be regarded as an individual lens. The term lens is also used to include both optical elements in which light rays enter on one side and leave from the other side and optical elements that carry a reflective layer, so that light rays enter on one side, travel through the lens and are then reflected back through the side of entry; see FIG. 12.)

Because preferred lenses of the invention are flexible, a large continuous roll of lens stock may be prepared, with an array of individual lenses arranged along the length of the stock. A lens of the invention may be prepared by cutting a length from the lens stock which includes one or more individual lenses.

Usually the louvers in a lens of the invention are normal to the faces of the internally louvered layer. However, they may be tilted at other angles, and may even be tilted at angles that differ from louver to louver, as when a set of louvers is fanned so as to more closely parallel, and thus permit passage of, the rays emanating from a point source.

The improvement in contrast provided by a lens of the invention can be seen by placing a conventional linear echelon lens over one portion of an image-displaying lighted matrix of light-emitting diodes, and a louvered linear echelon lens of the invention over a different portion of the lighted matrix. A sharper contrast between image and background will be seen through the louvered linear echelon lens than through the conventional lens. Even if the image seen through the louvered lens is less bright, the improvement in contrast will make the image more easily read.

Besides improving contrast by reducing internal reflections, a louvered echelon lens of the invention also minimizes lighting of a lens surface by extraneous light, such as light intended to illuminate an adjacent lens. For example, when a lens of the invention comprising an array of side-by-side individual lenses is placed over a matrix of light-emitting diodes, each individual lens of the invention is generally unaffected by an adjacent portion of the matrix of light-emitting diodes. Further, images provided by lenses of the invention can be seen better out-doors in bright sunlight than can the images presented by a conventional lens, which may be completely obliterated by bright sunlight.

Lenses of the invention also are useful to take the place of fanned louvered films, as described above, in which louvers are tilted at angles that differ from louver to louver. Such fanned louvered films are difficult to make, but by constructions of the invention such fanning is achieved by refraction of light rays with lens elements.

BACKGROUND TEACHINGS

Internally louvered sheets of the kind useful in the present invention are taught in U.S. Pat. Re. No. 27,617. These sheets or films are conveniently made by skiving a continuous web from a cylindrical billet that has been prepared by compressing an assembly of alternate circular layers of clear polymeric material and black or other opaque or transparent colored layers. To improve the clarity of the product, clear films, preferably of the same polymer as the clear layers of the billet, may be laminated or coated on each side of the skived web.

Internally louvered sheets have previously been used in combination with echelon lenses, but these previous uses have been for purposes different from purposes or objects of the present invention, and these previous uses did not involve a discovery of the improved contrast and other advantages associated with the present invention. For example, Erwin, U.S. Pat. No. 3,511,563, describes overhead projectors which use a louvered film between the stage of the projector on which transparencies bearing an image to be projected are laid and an annular fresnel condensing lens through which the projection lamp is beamed. Such a use of a louvered film is found to limit glare from the lamp that would otherwise be seen by a person using the projector, who normally stands adjacent the projector so as to be able to point to portions of the projected image, to change transparencies, etc.

In the course of the Erwin patent, it is mentioned that the louvered film and fresnel lens can be incorporated into an integral structure. However, the structures suggested in the patent are different from those of the present invention — the structures of the patent would be large rigid structures combining concentric annular echelon lens elements and louvered film to give rise to disconcerting moiré patterns —, and they represent different discoveries — as illustrated by the fact that in the projector the louvers prevent glare to a user who is off the optical axis of the projector, while the present invention improves visibility for a viewer who is on the optical path. In the projector the louvers were a direct shield, whereas in the present invention, the louvers modify the characteristics of a lens.

Louvered films have also been used with planar transparent sheets in a display device that carries an image on the transparent sheet. In this way ambient light, either in back of, or in front of, the transparent sheet is shielded so as to darken the background, which could otherwise obliterate the image. The present invention is distinctive from such prior uses in that the structure combined with a louvered layer according to the invention has a configured surface, and the combination is found to reduce reflections that arise internally within the structure because of the configurations. A structure of the invention thus improves contrast between the image and background as transmitted by the lens, but does it without causing disconcerting moiré patterns.

All in all, the present invention provides an important improvement for many uses of echelon lenses by making the images transmitted by such lenses more clear and distinctive.

DETAILED DESCRIPTION

Figure 1:
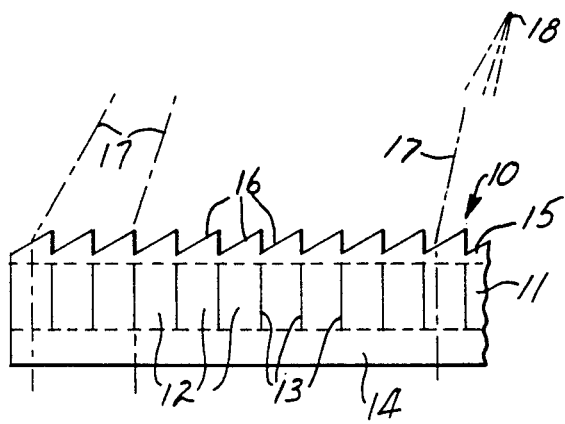
FIGS. 1–4 are enlarged end views through illustrative louvered echelon lenses of the invention.

An illustrative louvered echelon lens of the invention 10 is shown in enlarged cross-section in FIG. 1. This lens 10 comprises an internally louvered web 11, comprising clear polymeric matrix portions 12 and opaque layers 13, which may consist of polymeric material pigmented with carbon black, for example. An optically clear film, 14, preferably of the same material as the portions 12, is laminated to the bottom side of the internally louvered web 11, and a configured, optically clear layer 15, which is also preferably of the same material as the portions 12, is laminated to the top side of the internally louvered layer 11. The configurations 16 on the layer 15 are linear echelons lens elements that cooperate to direct light rays 17 transmitted through the sheet toward a linear focus 18.

A useful method for making a louvered lens as shown in FIG. 1 is to first prepare the internally louvered web or sheet 11 (as by skiving from a layered billet); then assemble preformed films of a desired polymer on each side of the internally louvered web; and then place the assembly between two platens of a press, one of the platens having a smooth surface for engagement against the layer 14, and the other platen being configured to provide the linear lens elements 16. Upon application of heat and pressure, the preformed films become bonded to the internally louvered layer 11 and the layer 15 is configured with the linear lens elements 16. Alternatively the assembly of layers may be passed between rollers, one roller being configured as an embossing roller and the other roller having a smooth surface. The three layers preferably at least have the same index of refraction and more preferably are of the same polymeric material; in the presence of heat and pressure the three layers become joined so that there is in effect no interface between the layers, at least none that has any significant optical effect.

Figure 2:
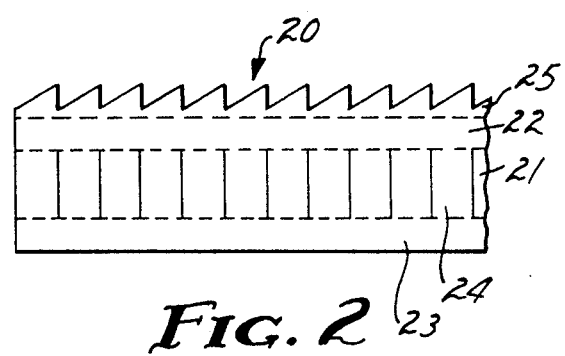

The construction shown in FIG. 1 is preferred, because it is more thin, therefore having less effect on transmitted light, and more flexible; because it requires less manufacturing steps; and because there are the fewest lines of juncture where potential optical interfaces could occur. However, louvered lenses of the invention may take other forms also. FIG. 2 shows a lens 20 such as results when a preformed louvered film 21 of the type described in U.S. Pat. Re. No. 27,617, having optically clear layers 22 and 23 on each side of a skived web 24, is laminated to a configured layer 25. For purposes herein the preformed film 21 is regarded as a single internally louvered sheet, and under proper conditions of manufacture, the lines of juncture between the layers 22 and 23 and skived web 24 have no significant optical effect; a skived web 11 of the lens 10 shown in FIG. 1 is also regarded as a single internally louvered sheet.

In the embodiments illustrated in FIGS. 1 and 2, adhesion between the configured optically clear layer and the internally louvered sheet is achieved directly by the heat and pressure of a laminating and embossing operation. The configured layer and louvered sheet are united in other ways in less preferred embodiments of the invention. A layer of adhesive material, which is preferably of the same index of refraction as the other layers of a lens of the invention, and which may be applied in solution, as a hot-melt, or as a liquid curable material, is used between the configured layer and louvered sheet in some embodiments of the invention. Interconnectors, such as linear projections that engage in linear grooves, are also useful and permit the use of inwardly facing echelon lens elements.

Figure 3:
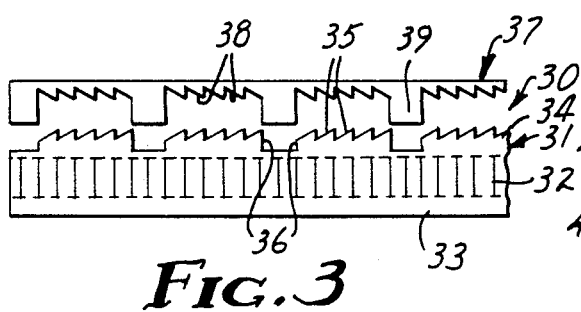
Figure 4:
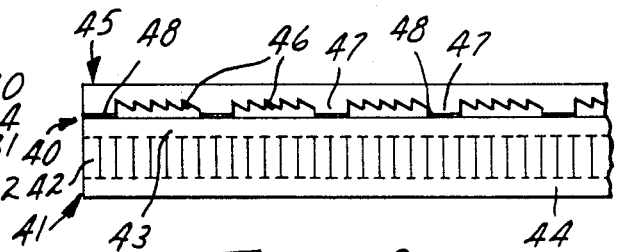

The latter kind of arrangement is illustrated in FIGS. 3 and 4. FIG. 3 shows, in exploded form, the components of lens 30 of the invention in which a first composite sheet 31 comprising a skived louvered web 32, a bottom clear layer 33, and a configured top layer 34 having linear lens elements 35 and linear grooves 36 is attached to a second composite sheet 37 configured with linear lens elements 38 and linear projections 39 which engage in the grooves 36 of the first composite sheet 31. FIG. 4 shows a lens of the invention 40 that includes a first composite sheet 41 comprising a skived louvered web 42 and top and bottom clear layers 43 and 44, and a second composite sheet 45 which is configured with linear lens elements 46 and has linear septa 47 on which a layer of adhesive 48 is applied to adhere the upper and lower composite sheets together.

Polymeric materials laminated together in forming a lens of the invention should be thermoplastic, or at least thermosoftenable during the step of laminating the materials together. A preferred polymeric material is cellulose acetate butyrate; other useful materials include cellulose acetate, cellulose acetate propionate; methacrylates such as polymethylmethacrylate; polycarbonates; polysulfones; and polyvinyl chloride. Echelon lenses made of glass also benefit from the invention.

To maximize the improved contrast provided by lenses of the invention, the configured layer of a lens of the invention should be as thin as possible, preferably less than 0.1 inch, more preferably less than 0.05 inch, and even more preferably less than 0.03 inch, thick; and a louvered web should be in direct contact with the configured layer. For lenses in which component parts are physically united other than by direct lamination, as illustrated in FIGS. 3 and 4, the spacing between opposed configurations or between configurations and a louvered web, is preferably less than 0.03 inch.

Figure 5:
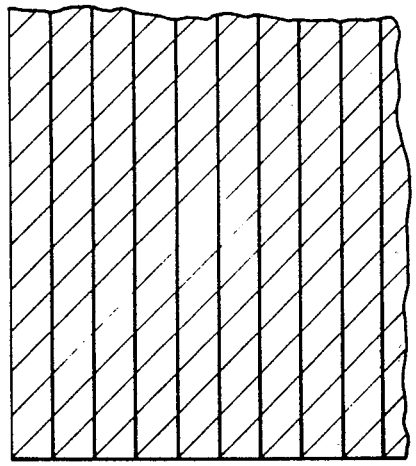
FIGS. 5 and 6 are enlarged top schematic views of louvered linear echelon lenses of the invention.
Figure 6:
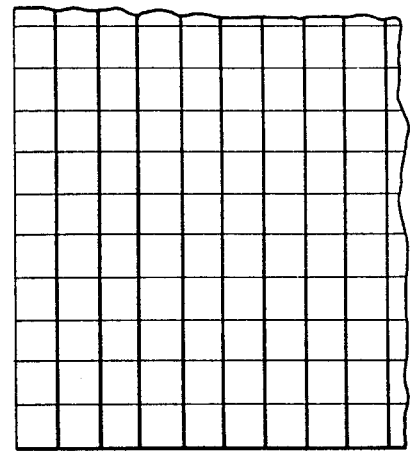

Moiré patterns occur in their most noticeable form when superposed louvers and echelon lens elements are slightly less than parallel. Two arrangements of superposed configured layer and louvered sheet are generally used in preferred lenses of the invention to minimize moire patterns: with the linear lens elements precisely parallel to and coincident with the louvers; and with the linear lens elements arranged at a significant angle to the louvers. The particular angle varies with such factors as the amount and uniformity of spacing between louvers and between echelon lens elements, but it usually is at least 10° and for preferred effects is at least 20° or 30°. FIGS. 5 and 6 are enlarged top views of louvered lenses of the invention in which the louvers and linear lens elements are at 45° and 90°, respectively, to one another. In addition, moiré patterns can be further minimized by using echelon elements of randomly varied width.

Figure 7:
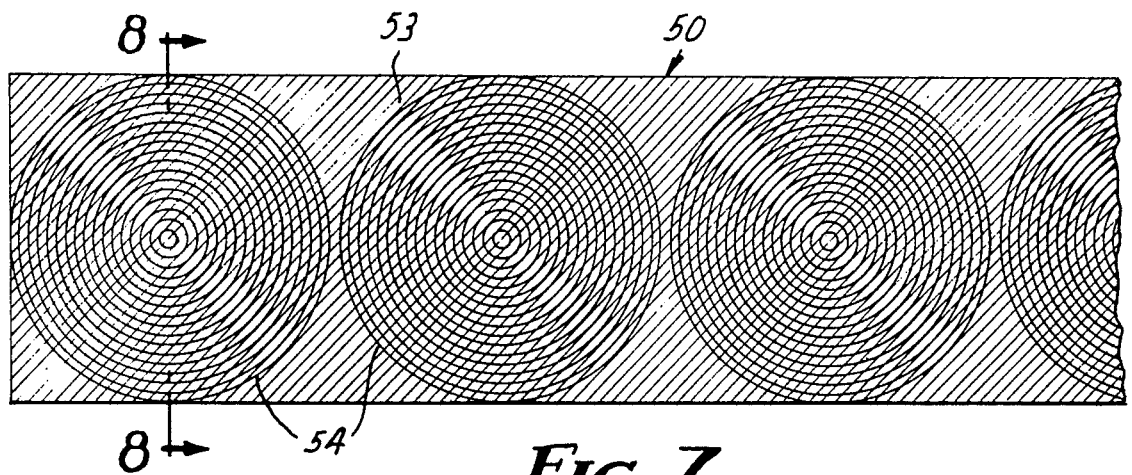
FIG. 7 is an enlarged top schematic view of a lens of the invention that comprises a longitudinally extending array of louvered annular lenses.
Figure 8:
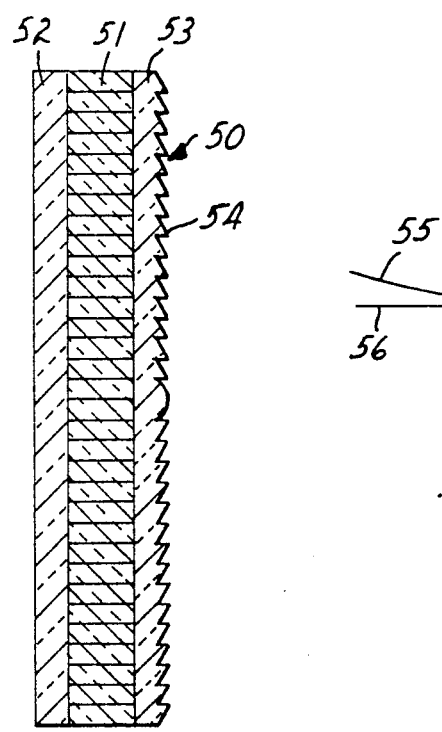
FIG. 8 is an enlarged cross-section through the lens of FIG. 7.

FIGS. 7 and 8 show a different flexible strip-type louvered echelon lens of the invention. This lens 50 comprises an internally louvered layer 51, a bottom clear layer 52, and a configured layer 53, in which the concentric annular configurations form a plurality of small annular echelon lenses 54. Generally the annular echelon lenses are analogs of concave or convex spherical or aspherical lenses of $f/2$ or less. A lens as shown in FIGS. 7 and 8 is particularly useful with matrix-type displays, with each annular lens 54 being associated with a particular component of the matrix.

Figures 9, 10:
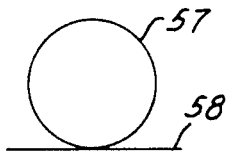
FIGS. 9 and 10 are schematic views illustrating how moiré patterns are reduced in louvered annular lenses of the invention.

For use in miniature matrix displays the lenses generally have diameters less than about 1 inch. The result, especially with lenses less than ¼ or ½ inch in diameter, is that moiré patterns are reduced to the point that they are generally not visible to the human eye. The reason for this reduction is shown in FIGS. 9 and 10. FIG. 9 represents the juxtaposition of an annular echelon lens element 55 from the edge of a relatively large-diameter annular echelon lens and a louver 56, while FIG. 10 represent the juxtaposition of an annular echelon lens element 57 from the edge of a small-diameter annular echelon lens and a louver 58. As seen, the length of overlap between the annular echelon lens element and louver is much larger for the structure represented in FIG. 9 than for the structure represented in FIG. 10. Since it is this overlap that is responsible for moiré patterns, the shortening of the overlap reduces moiré patterns. FIG. 7, because it is enlarged and because it is a drawing with lines of appreciable thickness, illustrates quite strong moiré patterns.

Figure 11:
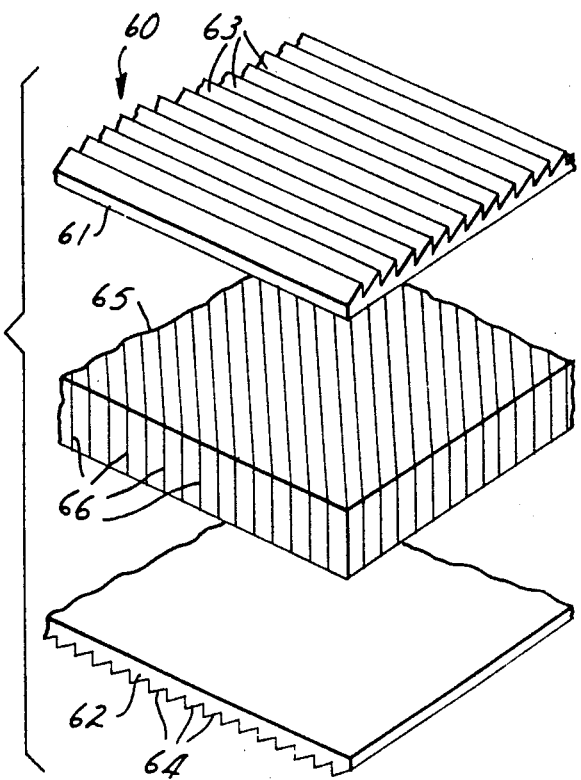
FIG. 11 is an enlarged exploded view of a lens of the invention that includes two orthogonally superposed linear echelon lenses and an internally louvered layer.

As previously noted, the invention also provides large diameter louvered echelon lenses free of noticeable moiré patterns but providing the two-axis or point focusing of an annular echelon lens. In such a two-axis lens, two or more linear echelon lenses are superposed, with the linear echelon lens elements generally orthogonal to one another. An internally louvered sheet is used together with such superposed linear echelon lenses so as to avoid noticeable moire patterns. For example, the lens of the invention 60 shown in FIG. 11 includes two superposed configured layers 61 and 62 each having linear echelon lens elements 63 and 64, respectively, with a louvered web 65 between the two layers 61 and 62. The linear echelon lens elements 63 and 64 are at 90° to one another and at 45° to the louvers 66 of the louvered web 65. In other arrangements the louvers are parallel or at other angles to the linear echelon lens elements. More than two linear echelon lenses may be superposed, to achieve particular focusing effects.

Figure 12:
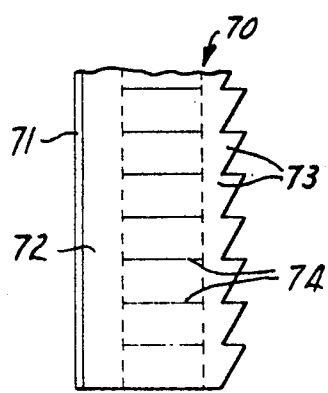
FIG. 12 is a reflective louvered echelon lens of the invention.

FIG. 12 shows a lens of the invention 70 which carries a layer of specularly reflective material, such as vapor-deposited aluminum, over an optically clear layer 72. Thus, light rays that enter through echelon lens elements 73 and pass between the louvers 74 are reflected and returned by the reflective layer 71.

The ratio of the distance between the louvers of an internally louvered web to the thickness of the web is regarded as the "aspect ratio" of the internally louvered web. The lower the aspect ratio, the greater the contrast, with little effect on normally incident controlled light. For best results, especially where two superposed configured layers are used, the louvered web has focused or fanned louvers (that is, the louvers are arranged at varying angles that tend to parallel light rays to be transmitted between the louvers) which better accommodate light rays that have been refracted by the configured layer first encountered by the rays.

By "optically limiting louvers" it is meant that a light ray engaging the louver is significantly altered, as by absorption or reflection. Generally the louvers are opaque, but they also may be transparent to particular colors. In that way an internally louvered web or sheet acts as a filter, transmitting light having the color of the louvers, but absorbing light that is not the color of the louvers.

Although the illustrated lenses have echelon lens elements exposed to the air, it should be noted that the lens elements may also be internal in the lens structure. For example, a configured surface of a configured layer may be adhered to a polymeric material having an index of refraction that is significantly different (at least about 0.1 unit different) from the index of refraction of the configured layer. That significantly different polymeric material may be the polymeric matrix of the louvered sheet or it may be a layer disposed between the configured layer and internally louvered sheet.

What is claimed is:

1. A louvered echelon lens capable of transmitting improved-contrast images comprising a unitary sheet that includes
    1. an optically clear layer having a large-area surface configured as a linear echelon lens; and
    2. an internally louvered layer superposed in optical connection with said clear layer and comprising an optically clear polymeric matrix and a set of thin light-absorbing linear louvers each supported within the matrix at an angle to the faces of the layer and aligned in spaced side-by-side relation so as to transmit light toward said configured surface while reducing light internally reflected within said lens; said louvers extending in a direction other than a direction that forms an angle of slightly greater than 0° up to 10° with the linear echelon lens elements so as to minimize moire patterns that arise because of juxtaposition of echelon lens elements and louvers.

2. The lens defined in claim 1 wherein the angle is 0° and said louvers are parallel to the linear echelon lens elements.

3. A lens of claim 1 in which the optically clear layer comprises the same polymeric material as the polymeric matrix of the internally louvered layer.

4. A lens of claim 1 in which the optically clear layer is thermally laminated in direct contact with the internally louvered layer.

5. A lens of claim 1 in which a layer of reflective material is incorporated in the lens so as to return light rays that enter through a large-area surface of the lens.

6. A lens of claim 1 in which the louvers are at right angles to the faces of the internally louvered layer.

7. A lens of claim 1 in which the louvers are slanted at an angle other than 90° to the faces of the internally louvered layer.

8. A lens of claim 1 in which at least some of the louvers are at different angles to the faces of the internally louvered layer than others of the louvers.

9. A lens of claim 1 in which the louvers extend at an angle of greater than about 10° to the linear echelon lens elements.

10. A lens of claim 1 in which the louvers extend at right angles to the linear echelon lens elements.

11. A lens of claim 1 in which the internally louvered layer is a web skived from a layered billet and the optically clear layer is laminated in direct contact to said web.

12. A lens of claim 1 which includes a second optically clear layer of polymeric material disposed on the other side of said internally louvered layer, said second optically clear layer having a large-area surface configured as a linear echelon lens.

13. A lens of claim 12 in which the linear echelon lens elements of the second optically clear layer are at approximately right angles to the linear echelon lens elements of the first optically clear layer.

14. A lens of claim 13 in which the louvers of the internally louvered layer make an angle of greater than 10° to the linear echelon lens elements of both optically clear layers.

15. A thin flexible louvered echelon lens capable of transmitting improved-contrast images comprising a unitary flexible sheet that includes
    1. an optically clear layer having a large-area surface configured as a linear echelon lens; and
    2. an internally louvered layer fused in direct physical and optical connection over the whole interface with said clear layer and comprising an optically clear polymeric matrix and a set of thin light-absorbing linear louvers each supported within the matrix at an angle of about 90° to the faces of the layer and aligned in spaced side-by-side relation so as to transmit light toward said configured surface while reducing light internally reflected within said lens; said louvers extending in a direction other than a direction that forms an angle of slightly greater than 0° up to 10° with the linear echelon lens elements so as to minimize moire patterns that arise because of juxtaposition of echelon lens elements and louvers.

16. A lens of claim 15 in which the louvers extend at an angle of greater than 10° to the linear lens elements.

17. A lens of claim 15 in which the optically clear layer comprises the same polymeric material as the polymeric matrix of the internally louvered sheet.

18. A lens of claim 15 in which said optically clear layer is less than 0.03 inch thick.

19. The lens defined in claim 15 wherein the angle is 0° and the louvers are parallel to the linear echelon lens elements.

* * * * *